US 7,703,846 B2

(12) United States Patent
Geyer et al.

(10) Patent No.: US 7,703,846 B2
(45) Date of Patent: Apr. 27, 2010

(54) CYCLE SEAT WITH ADJUSTABLE SIDES

(76) Inventors: James B. Geyer, 2303 Stockton Rd., Phoenix, MD (US) 21131-1123; Thomas C. Geyer, 21311 High Rock Rd., Monroe, WA (US) 98272

( * ) Notice: Subject to any disclaimer, the term of this patent is extended or adjusted under 35 U.S.C. 154(b) by 0 days.

(21) Appl. No.: 12/285,319

(22) Filed: Oct. 1, 2008

(65) Prior Publication Data

US 2009/0102252 A1    Apr. 23, 2009

Related U.S. Application Data

(60) Provisional application No. 60/960,979, filed on Oct. 23, 2007.

(51) Int. Cl.
*B62J 1/00* (2006.01)
(52) U.S. Cl. .................. 297/201; 297/195.1; 297/284.9
(58) Field of Classification Search .............. 297/284.9, 297/195.1, 201
See application file for complete search history.

(56) References Cited

U.S. PATENT DOCUMENTS

| 694,875 | A | * | 3/1902 | Meighan ...................... 297/201 |
| 4,176,880 | A | | 12/1979 | Marchello |
| 4,673,212 | A | | 6/1987 | Mayer |
| 4,776,632 | A | * | 10/1988 | Akimori et al. .......... 297/284.9 |
| 4,877,286 | A | | 10/1989 | Hobson et al. |
| 5,123,698 | A | | 6/1992 | Hodges |
| 5,352,016 | A | | 10/1994 | Hobson |
| 5,725,274 | A | | 3/1998 | Bergmeister |
| 5,823,618 | A | | 10/1998 | Fox et al. |
| 5,938,278 | A | | 8/1999 | Langevin |

(Continued)

FOREIGN PATENT DOCUMENTS

DE    10253575    5/2004

(Continued)

OTHER PUBLICATIONS

Website, http://www.bizrate.com/bicycles_equipment/oid387109404.html, Easy Seat Adjustable Bike Seat, three sheets printed from the Internet on Jul. 17, 2006.

(Continued)

*Primary Examiner*—Sarah B McPartlin
(74) *Attorney, Agent, or Firm*—Richard C. Litman

(57) ABSTRACT

The cycle seat with adjustable sides includes a base plate having a forward and optionally a rearward guide plate thereon. Each guide plate includes laterally adjustable left and right arm extensions, with each arm having a generally vertical wing extending upwardly therefrom. The arms of each pair simultaneously adjust inwardly and outwardly opposite one another, permitting a single adjustment to adjust both wings of a set equally. Each wing pair includes a latch mechanism, which is adjustable as the cyclist rides the cycle. The seat may be installed per se upon a bicycle or other cycle, or may be installed in combination with a longitudinal and/or arcuate and vertical adjustment mechanism for the seat. The cycle seat greatly reduces or eliminates the need for a pommel, while assuring that the seat remains in contact with the hips and/or thighs of the cyclist at all times to assure more complete control.

19 Claims, 8 Drawing Sheets

U.S. PATENT DOCUMENTS

| | | | |
|---|---|---|---|
| 6,068,333 | A | 5/2000 | Dixon |
| 6,209,954 | B1* | 4/2001 | Bombardier ................. 297/201 |
| 6,290,291 | B1* | 9/2001 | Kojima ....................... 297/201 |
| 6,422,647 | B1 | 7/2002 | Turudich |
| 6,488,334 | B1 | 12/2002 | Geyer et al. |
| 6,554,355 | B2 | 4/2003 | Kaptur |
| 6,575,529 | B1* | 6/2003 | Yu ............................. 297/201 |
| 6,652,025 | B2 | 11/2003 | Sylvester |
| 6,786,542 | B1 | 9/2004 | Nuzzarello |
| 6,827,397 | B1 | 12/2004 | Driver |
| 6,883,865 | B2 | 4/2005 | Geyer et al. |
| 7,494,181 | B2* | 2/2009 | Tucker ....................... 297/201 |
| 2001/0008348 | A1* | 7/2001 | Nelson .................... 297/195.1 |
| 2003/0038515 | A1 | 2/2003 | Martin et al. |
| 2003/0080594 | A1 | 5/2003 | Geyer et al. |

FOREIGN PATENT DOCUMENTS

| | | |
|---|---|---|
| EP | 1069037 | 1/2001 |
| WO | WO 02/14142 | 2/2002 |

OTHER PUBLICATIONS

Website, http://www.derri-air.com/easyseat-bicycle-seat.htm, Standard Easy Seat Dual Pad Seat, four sheets printed from the Interent on Jul. 17, 2006.

* cited by examiner

CYCLE SEAT WITH ADJUSTABLE SIDES

CROSS-REFERENCE TO RELATED APPLICATION

This application claims the benefit of U.S. Provisional Patent Application Ser. No. 60/960,979, filed Oct. 23, 2007.

BACKGROUND OF THE INVENTION

1. Field of the Invention

The present invention relates generally to seating devices for bicycles and other pedal powered cycles. More specifically, the present invention comprises various embodiments of a cycle seat having laterally adjustable side panels or wings, which provide lateral support for the hips and upper thighs of the rider. The cycle seat per se may be installed upon a cycle, or may be installed in combination with other seat adjustment mechanisms, as desired.

2. Description of the Related Art

Cycle seats, particularly for relatively unstable vehicles such as bicycles and unicycles, must provide reasonable security for the cyclist while also providing the cyclist with leverage for maneuvering the cycle. This has been accomplished conventionally by means of a relatively small seating surface with a forwardly extending pommel that fits between the upper thighs of the cyclist, enabling the cyclist to brace against the pommel to a certain extent while pedaling and/or maneuvering. The forwardly extending central pommel has its disadvantages, however, with perhaps the chief disadvantage being the pressure applied to the perineal area of the cyclist during certain riding conditions.

As a result, a number of cycle seat configurations have been developed which greatly reduce or eliminate the forwardly extending central pommel. Most such seats provide some other means for the cyclist to stabilize himself or herself on the cycle, e.g., by means of generally vertical, laterally disposed side panels or wings extending upwardly from the opposite left and right edges of the seat. Such laterally disposed wings can be of some assistance in providing better control for the rider, but this is generally true only under a relatively narrow set of conditions. For example, when the cyclist stands on the pedals for greater leverage when accelerating or hill climbing, he or she must perform all other control functions with the arms, as there is no seat contact. Even in the case of an articulating seat, the seat must contact different parts of the cyclist's body at different times, i.e., the hips when the rider is standing on the pedals during hard pedaling operations, with contact reverting to the upper thighs when the cyclist is seated upon the seat. Moreover, a seat with fixed lateral side members or wings cannot possibly fit all cyclists; some form of adjustment is required, and such adjustment should be achievable by the cyclist while actually cycling, as the cyclist adjusts his or her position relative to the seat during different cycling conditions.

The present inventors are aware of a number of adjustable cycle seating configurations that have been developed in the past. An example is found in German Patent No. 10,253,575, published on May 13, 2004. This publication describes (according to the drawings and English abstract) a bicycle having a longitudinally and vertically adjustable seat by means of a pivotally mounted seat post structure and a turnbuckle link having an adjustable length. The seat configuration per se is only generally indicated.

Thus, a cycle seat with adjustable sides solving the aforementioned problems is desired.

SUMMARY OF THE INVENTION

The cycle seat with adjustable sides includes a base plate having either one or two laterally disposed wing adjustment guide plates thereon, i.e., a forward and a rearward guide plate in the case of a double mechanism. Each guide plate includes two tracks for corresponding laterally adjustable arms, with each arm having a generally vertical wing at its distal end. Each pair of arms, i.e., the two arms of the front guide plate and the two arms of the rear guide plate, includes a pinion gear therebetween, thus requiring the two corresponding arms to adjust outwardly and inwardly simultaneously and equally relative to one another. A latch mechanism is provided for each guide plate and corresponding left and right arm assembly, with the latch mechanisms being adjustable by the cyclist while operating the cycle. A seat is immovably affixed atop the base plate, with the wing adjustment mechanism and inner portions of the arms being captured between the seat and the underlying base plate.

The above-described seat assembly may be installed per se upon a bicycle, unicycle, tricycle, or other pedal powered vehicle. Other embodiments provide for the longitudinal and/or articulating adjustment of the cycle seat, in accordance with additional mechanism.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a cycle seat having laterally adjustable sides and other adjustment means. The cycle seat provides lateral bracing or support for the thighs and/or hips of a cyclist, thereby reducing the need for a seat pommel between the upper thighs of the cyclist. The seat may be mounted directly upon the seat post of the cycle, or upon additional adjustment mechanism(s) for further seat adjustment, as desired.

Figure 1:
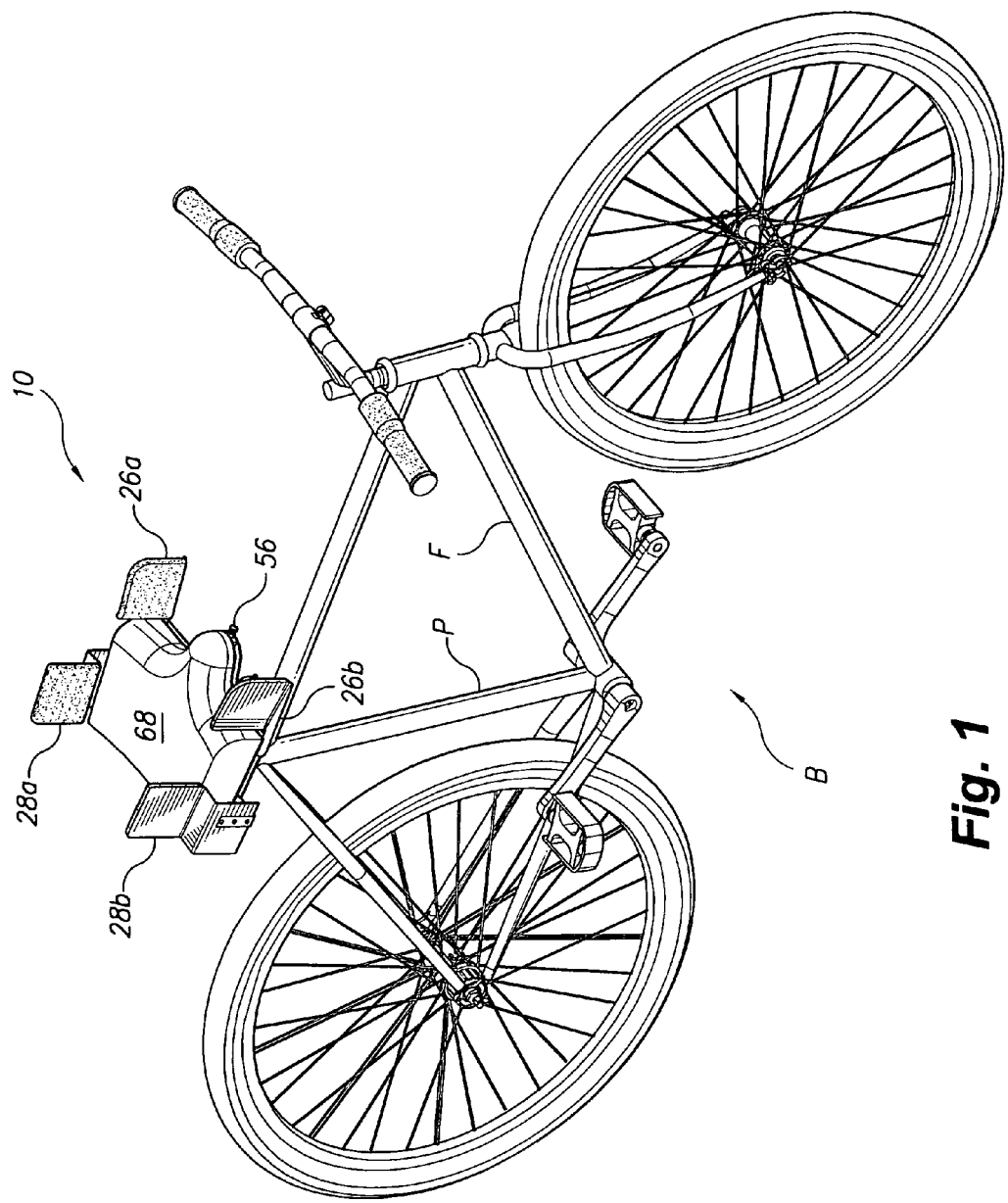
FIG. 1 is an environmental, perspective view of a cycle seat with adjustable sides according to the present invention, installed upon a bicycle.
Figure 2:
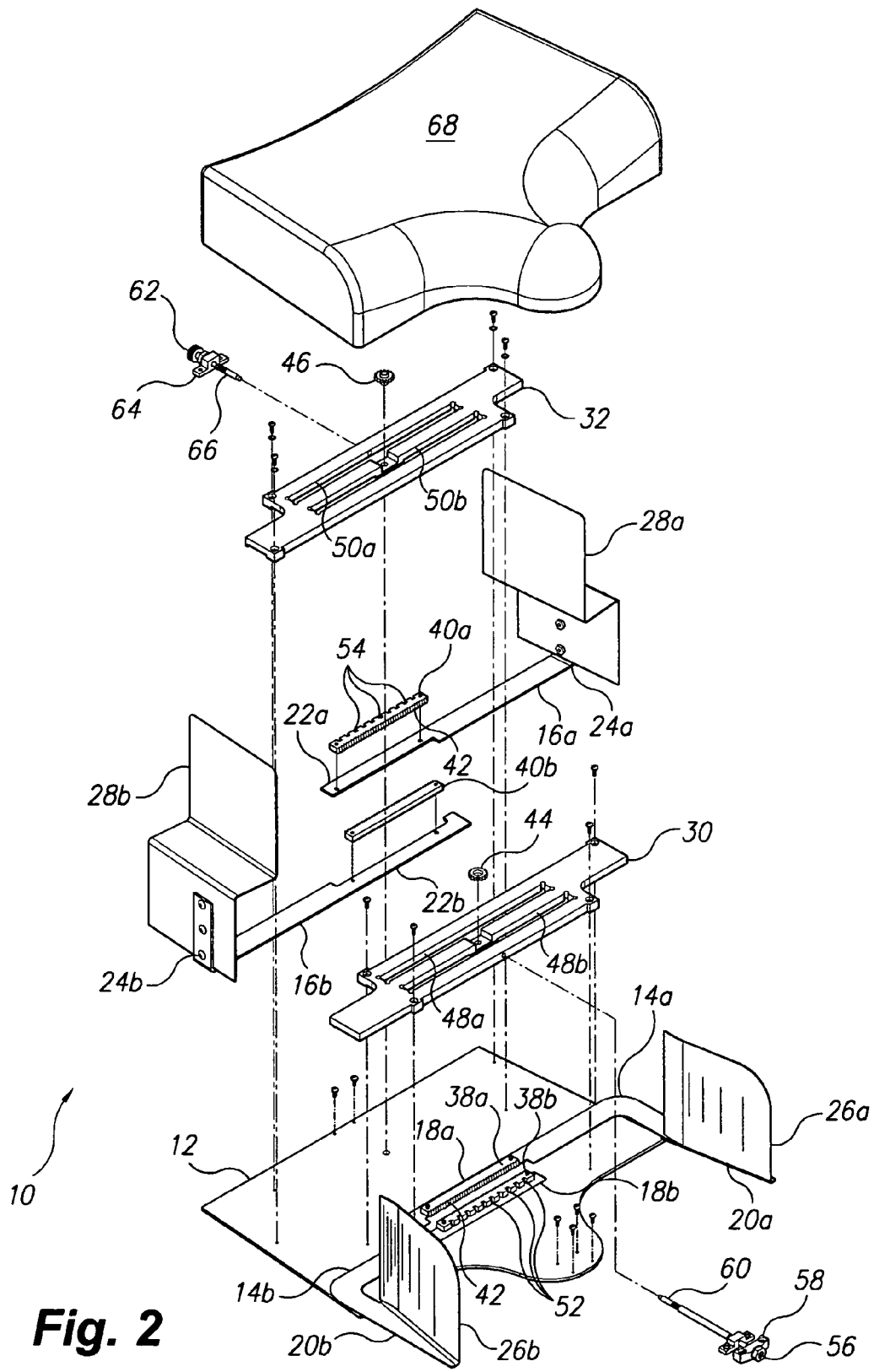
FIG. 2 is an exploded perspective view of the cycle seat of FIG. 1, illustrating its various components and their relationships with one another.
Figure 3:
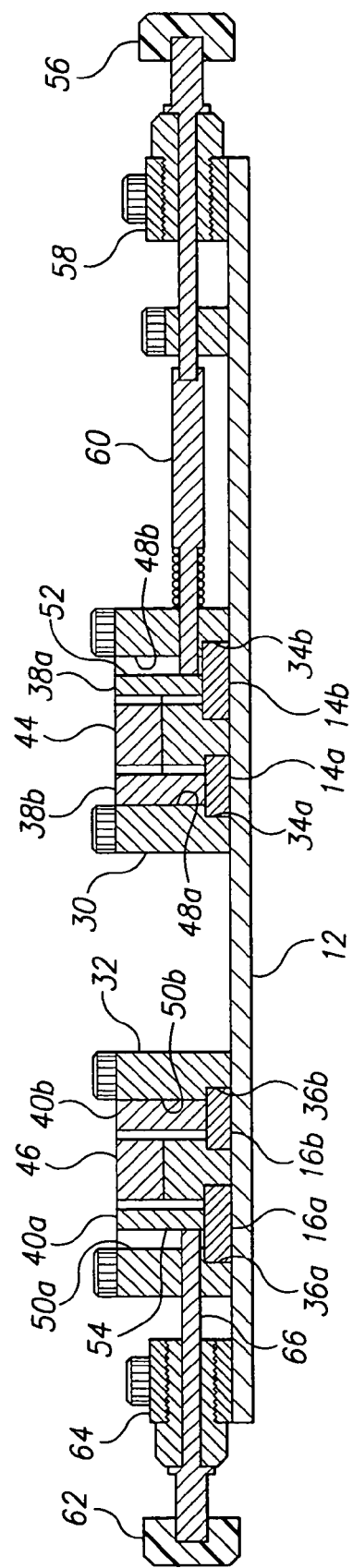
FIG. 3 is a right side elevation view in section of the seat assembly, showing the interrelationship of the various components.

FIG. 1 of the drawings illustrates a first embodiment of the present cycle seat 10 mounted directly upon the seat post P of the frame F of a bicycle B, with FIGS. 2 and 3 illustrating further details of the laterally adjustable side mechanism. The seat 10 includes a base plate 12 upon which the remainder of the mechanism is attached. At least one pair of laterally adjustable extension arms are installed atop the base plate 12, with there preferably being forwardly disposed left and right side thigh extension arms 14a and 14b and rearwardly disposed left and right side hip extension arms 16a and 16b.

Each of the forward or thigh support extension arms 14a, 14b includes a base plate attachment end portion 18a, 18b and an opposite distal or outboard thigh wing or bolster attachment end portion 20a, 20b. The rearward or hip support extension arms 16a, 16b include similar base plate attachment ends 22a and 22b, with opposite distal or outboard hip wing or bolster attachment end portions 24a and 24b. Left and right side thigh support wings or bolsters 26a and 26b attach to the respective thigh wing or bolster attachment end portions 20a and 20b of the forward extension arms 14a, 14b, with left and right side hip support wings or bolsters 28a and 28b attaching to the hip wing or bolster attachment end portions 24a, 24b of the rearward extension arms 16a and 16b. The various bolsters or wings 26a through 28b may be padded or upholstered, as shown along the inboard surfaces of the two left side wings 26a and 28a in FIG. 1.

The various extension arms 14a through 16b are captured upon the base plate by respective forward and rearward guide plates 30 and 32, with the two guide plates 30, 32 extending laterally across the base plate 12 and being attached thereto by appropriate fasteners (cap screws, etc.). Each guide plate 30, 32 includes a pair of underlying extension arm channels, i.e., extension arm channels 34a, 34b for the forward or thigh extension arm guide plate 30 and extension arm channels 36a, 36b for the rearward or hip extension arm guide plate 32. These extension arm channels 34a through 36b are shown in the sectional view of FIG. 3, with the respective extension arms 14a through 16b installed therein.

Each of the extension arms 14a through 16b includes a toothed rack disposed along the inboard or base plate attachment portion thereof. The forward extension arm racks 38a, 38b are shown attached to the base plate attachment portions 18a, 18b of the forward extension arms 14a, 14b, with the rearward racks 40a, 40b being shown separated from their respective base plate attachment portions 22a, 22b of the two rearward extension arms 16a, 16b. The toothed edges or faces 42 of each pair of racks, i.e., the forward rack pair 38a, 38b and the rearward rack pair 40a, 40b face one another, and engage respective forward and rearward pinion gears 44 and 46 disposed therebetween, which, in turn, rotate on shafts affixed within their respective forward and rearward guide plates 30 and 32. Rack clearance slots are provided through the guide plates 30 and 32, i.e., clearance slots 48a, 48b in the forward guide plate 30 for the two racks 38a, 38b of the forward arms 14a and 14b, and slots 50a, 50b in the rearward guide plate 32 for the two racks 40a, 40b of the rearward arms 16a and 16b.

Thus, each extension arm of an extension arm set or pair, e.g., the two forward extension arms 14a, 14b, is forced to move simultaneously with, but opposite to, its opposite arm due to their toothed racks 38a, 38b simultaneously engaging the forward pinion 44. As the pinion 44 rotates e.g., clockwise when viewed from above, both the left and right forward extension arms 14a and 14b are caused to move outwardly simultaneously with one another. Thus, the rider of a cycle equipped with the cycle seat 10 may push or pull either of the two extension arms of an extension arm set, or their corresponding wings or bolsters, e.g., the left front arm 14a and/or its wing 26a, to adjust both wings of the pair or set inwardly or outwardly simultaneously with one another.

The seat 10 with its laterally adjustable side wings or bolsters also includes a locking mechanism for each wing or bolster pair. The forwardly disposed rack of the front extension arm pair and the rearwardly disposed rack of the rear extension arm pair, i.e., racks 38b and 40a, each include detents 52 and 54 along their respective forward and rearward faces, i.e., those faces opposite their toothed faces 42. A forward extension arm locking knob 56 is adjustably secured to the forward portion of the base plate 12 by a block 58, with the knob 56 controlling forward and rearward motion of a detent engaging pin 60 for selective engagement of the detents 52 of the forward rack 38b. A rearward extension arm locking knob 62, retaining block 64, and pin 66 function similarly to the forward knob and pin assembly to selectively engage the detents 54 of the rear rack 40a.

These knobs 56 and 62 are spring-loaded to cause their pins 60 and 66 to engage the corresponding rack detents 52 and 54. When either of these knobs 56 and/or 62 is pulled outwardly, i.e., away from the remainder of the mechanism, the corresponding pin 60 or 66 is withdrawn from the detents 52 or 54 of its respective front or rear rack 38b or 40a, allowing the cyclist to adjust the corresponding front or rear wings or bolsters 26a, 26b or 28a, 28b. The knob mechanisms may be temporarily locked in an outward, i.e., detent disengaged, position against their internal springs by conventional means, e.g., quarter-twist detents or catches, etc., to hold the lock knobs and their pins clear of the rack detents. Suitable lock knobs and pins are manufactured by the Carr-Lane Manufacturing Co. of St. Louis, Mo., and may be used for the detent engagement and locking knobs and pins described above. Alternative mechanisms serving substantially the same function may be substituted.

The cycle seat 68 is immovably affixed atop the base plate 12 and its forward and rearward guide plates 30 and 32, and associated mechanism. The inboard or base plate end portions 18a, 18b and 22a, 22b of the extension arms 14a through 16b are thus captured between the seat 68 and the underlying guide plates 30, 32 and base plate 12. However, they are free to slide inwardly and outwardly beneath the seat 68 and within the corresponding channels 34a through 36b of their guide plates 30 and 32, when the corresponding forward and/or rearward lock knobs 56, 62 are pulled to disengage their pins 60, 66 from the detents 52, 54 of the forward and rearward racks 38b and 40a. This allows the lateral spacing between the forward and rearward wings 26a, 26b and 28a, 28b to be adjusted by the cyclist relative to the seat 68 therebetween.

Figure 4:
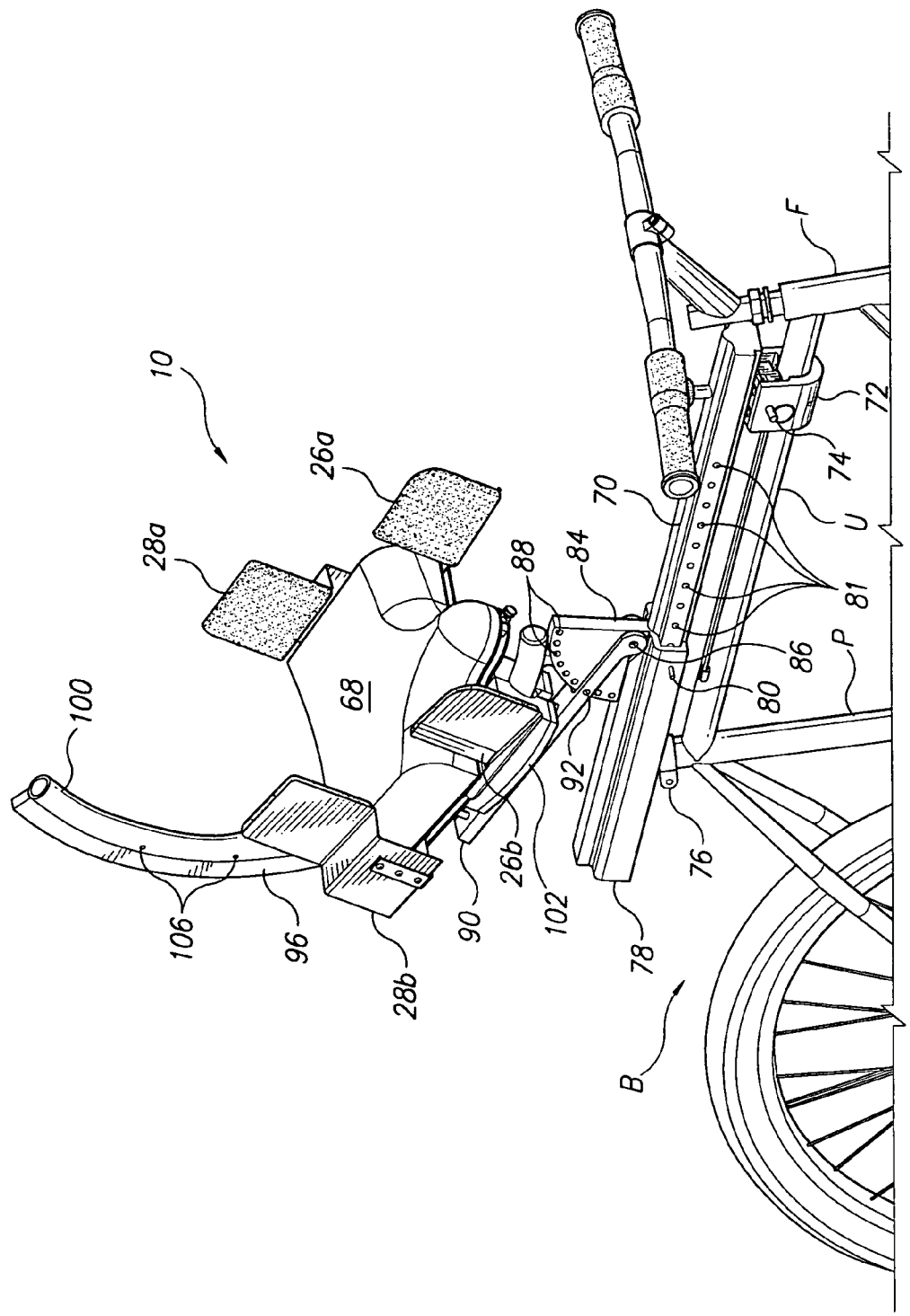
FIG. 4 is a perspective view of an alternative embodiment of the cycle seat, showing its attachment to a longitudinal and arcuate adjustment mechanism on the upper frame of a bicycle.
Figure 5:
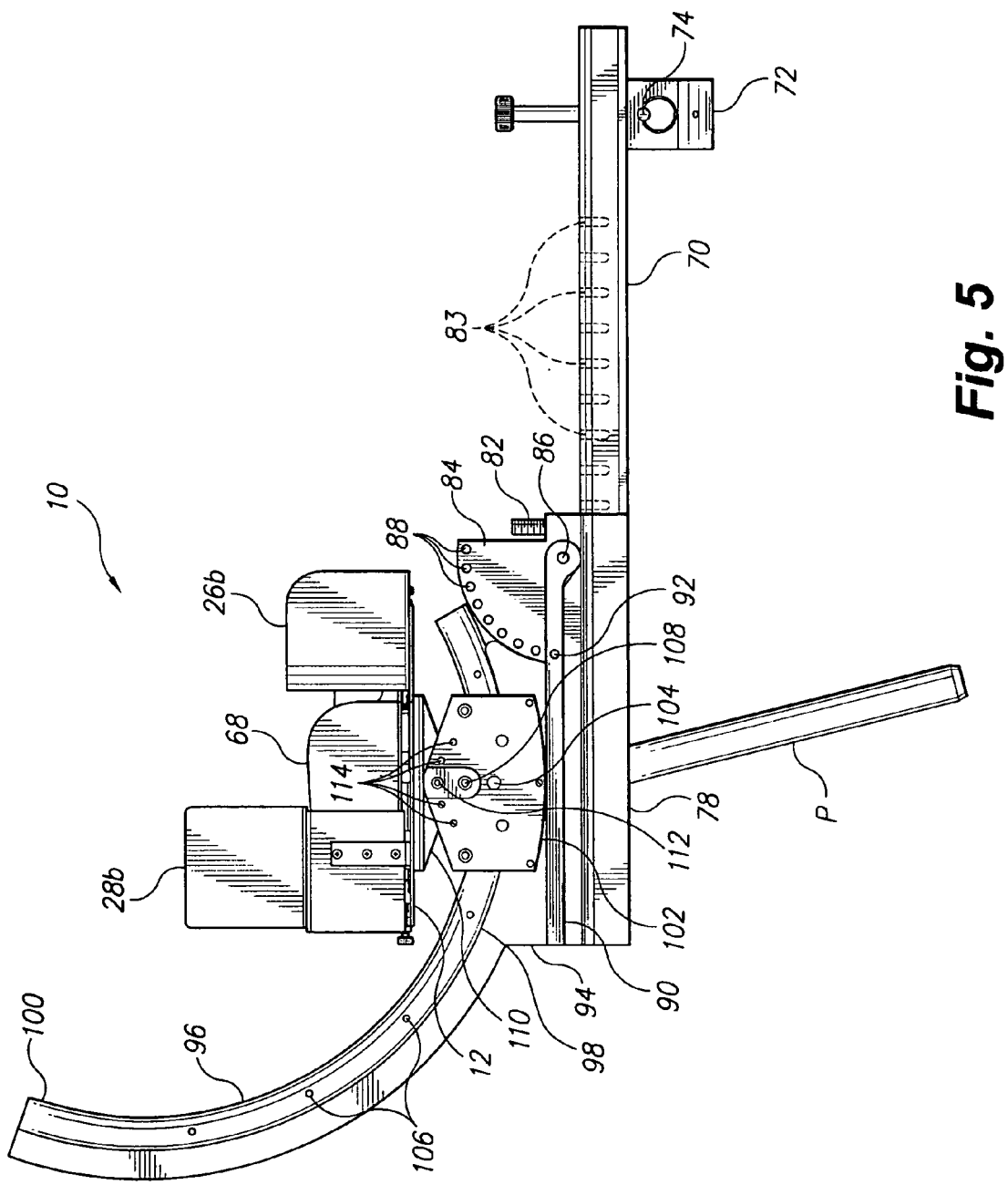
FIG. 5 is a detailed right side elevation view of a slightly modified embodiment of the cycle seat assembly of FIG. 4, showing the seat in its lowermost horizontal position on the adjustment mechanism.
Figure 6:
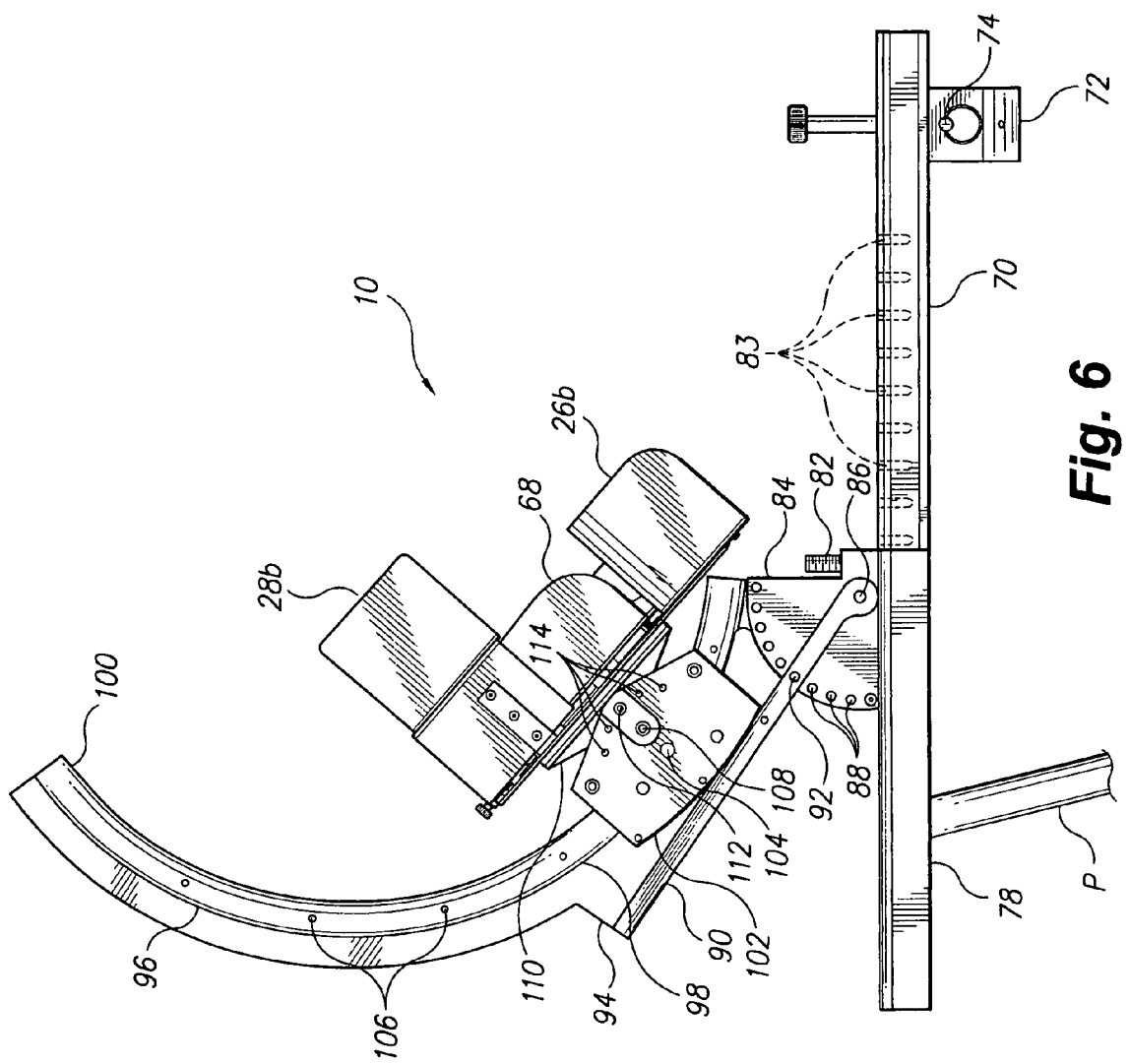
FIG. 6 is a detailed right side elevation view of the embodiment of FIG. 5, showing the seat with the arcuate track raised to adjust the seat position.

FIGS. 4 through 6 illustrate additional seat adjustment mechanisms that may be incorporated in the cycle seat 10, if so desired. The seat adjustment mechanisms of FIGS. 4 through 6 are removably attached to the upper member U of the frame F of a bicycle B, and provide for the longitudinal, arcuate, angular, and/or leveling adjustment of the seat assembly 10 in a plane coplanar with the bicycle frame F. The seat adjustment mechanism of FIGS. 4 through 6 includes a straight, elongate cycle frame attachment rail 70 having a forward end removably secured to the upper member U of the cycle frame F by a bracket 72 and removable attachment pin 74, and an opposite rearward end removably attached to the seat post member P by conventional means, e.g., seat post clamp 76 as shown in FIG. 4.

A seat base support sleeve 78 is slidably and adjustably installed along the attachment rail 70 to provide longitudinal adjustment of the seat assembly 10, with the sleeve 78 being selectively locked in position along the rail 70 by a lateral pin 80 (FIG. 4) or vertical lock pin or screw 82 (FIGS. 5 and 6). Alternatively, the lateral pin or vertical lock screw may be replaced by a conventional electrically actuated solenoid having an electromagnetically actuated pin 80 or 82. In the case of the manually or solenoid actuated lateral pin 80 of FIG. 4, the pin selectively engages one of a series of laterally disposed detents 81 along the side of the cycle frame attachment rail 70. In the case of the manually actuated vertical locking screw or solenoid actuated pin 82 of FIGS. 5 and 6, the screw or pin 82 selectively engages one of a series of vertically disposed detents 83, shown in broken lines in FIGS. 5 and 6 in the frame attachment rail 70.

The sleeve 78 includes an arcuate quadrant plate 84 integrally formed therewith and extending upwardly from the forward end thereof. A pivot pin 86 is removably installed transversely through the arcuate center of the quadrant plate 84, with a series of detent passages 88 being formed through the plate adjacent the periphery thereof. A bifurcated seat track support arm 90 is pivotally secured to the origin of the quadrant plate 84 by the pivot pin 86, and is selectively secured at the desired angle through one of the detent passages by a lock pin 92. Alternatively, the lock pin 92 may be manually actuated, or may be actuated by a conventional electrically-actuated solenoid, in the manner of the alternative solenoids described further above for actuating the pins 80 and/or 82 for locking the position of the seat base support sleeve 78 along the frame attachment rail 70.

A seat assembly support track web 94 extends from the seat track support arm 90, with an arcuate seat assembly support track 96 having a cycle structure attachment portion 98 integrally formed with the web 94 and seat track support arm 90 and an opposite upper distal end 100. A seat assembly attachment trolley 102 travels along the arcuate seat assembly support track 96, and may be selectively locked in position thereon by a trolley position lock pin 104 selectively engaging one of the lock pin passages 106 formed laterally through the arcuate seat assembly support track 96.

Alternatively, the lock pin 104 may be actuated by a conventional electric solenoid, as in the case of the alternative solenoids described further above for actuating the pins 80 and/or 82 for locking the position of the seat base support sleeve 78 along the frame attachment rail 70. The seat base 12 of the seat assembly 10 is pivotally secured to the seat assembly attachment trolley 102 by a leveling pivot 108, which passes through a bracket 110 affixed to the underside of the seat base plate 12. A lateral seat leveling lock pin 112 (or alternatively, another solenoid) selectively engages one of a series of seat leveling pin detents 114 disposed through the side plate of the seat trolley 102 in a semicircular arc about the seat leveling pivot 108, similar to the series of seat arm lock detent passage 88 disposed about the trolley support arm pivot 86 through the arcuate quadrant plate 84.

The above-described seat adjustment mechanism illustrated in FIGS. 4 through 6 is capable of providing both longitudinal adjustment of the seat position along the longitudinal rail 70, and angular, arcuate, and height adjustment of the seat position by means of the angularly adjustable arcuate track 96 and trolley 102. Leveling of the seat assembly 10 with respect to the rail 70 is also provided by tilting the seat assembly 10 with respect to the trolley 102 by means of the seat-leveling lock pin or solenoid 112 and corresponding detents 114 in the seat trolley 102, as discussed further above. However, it will be seen that the adjustment mechanism of the longitudinal rail 70 and its sleeve 78 and adjustment mechanism of the arcuate track 96 and trolley 102 may be separated from one another, if so desired. If purely longitudinal movement of the seat assembly 10 is desired, the seat trolley 102 may be removed from the arcuate seat assembly support track 96, and the longitudinal sleeve 78 removed from its rail 70. The trolley 102 may then be installed directly to the rail 70 by installing the trolley position lock pin 104 through one of the lateral passages of the rail 70. Alternatively, the angular, arcuate, height, and leveling adjustment of the seat assembly 10 may be provided without longitudinal adjustment, by removing the attachment pin 86 of the bifurcated seat track support arm 90 from the quadrant 84, and removing the rail 70 from the upper member U of the bicycle frame F. The seat track support arm 90 may then be reinstalled through the passage of the upper frame previously used to secure the forward end of the rail 70 through the upper member U of the frame F.

Figure 7:
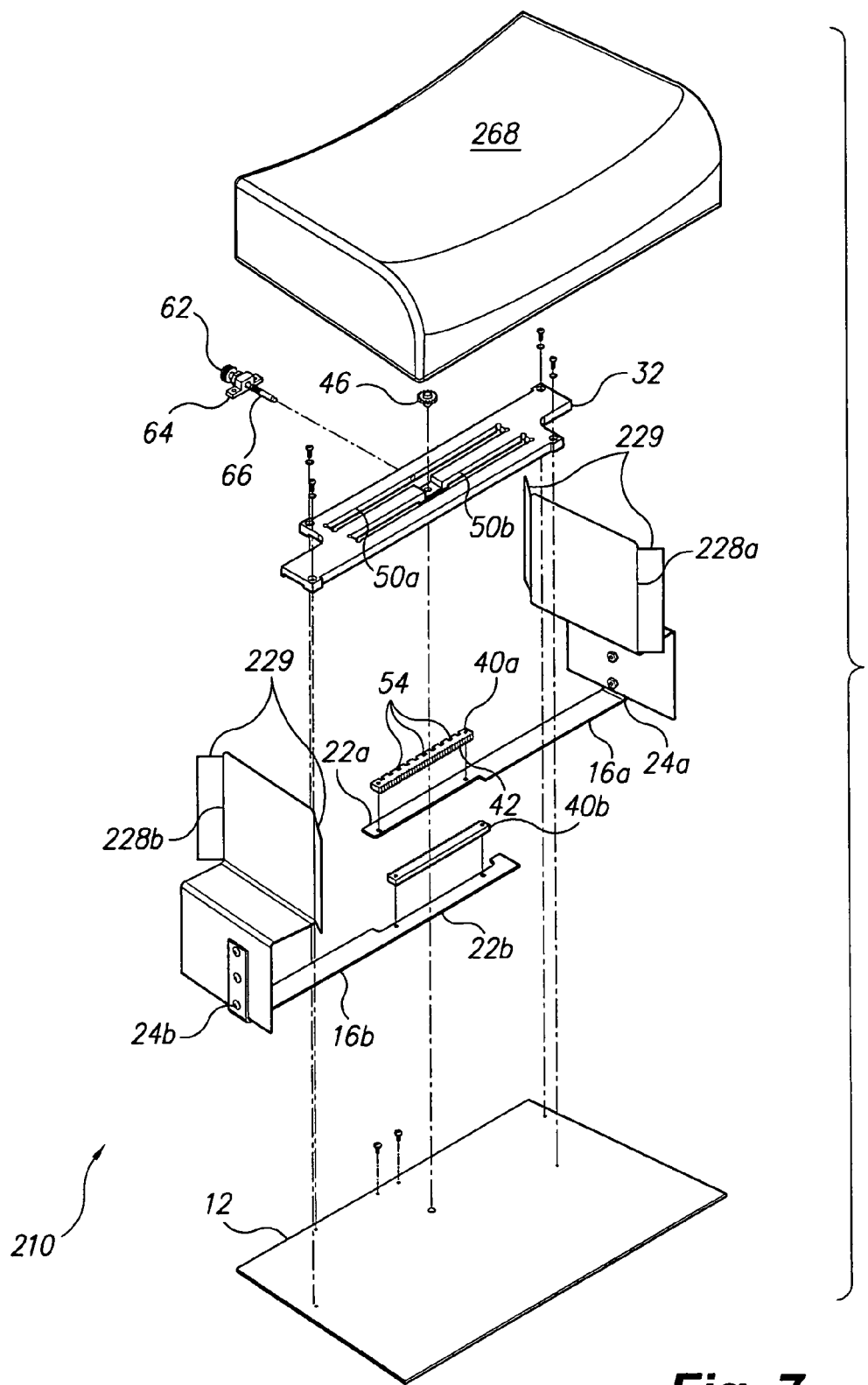
FIG. 7 is an exploded view of an alternative embodiment of a cycle seat with adjustable sides according to the present invention, having only a single set of adjustable sides for cradling the hips.
Figure 8:
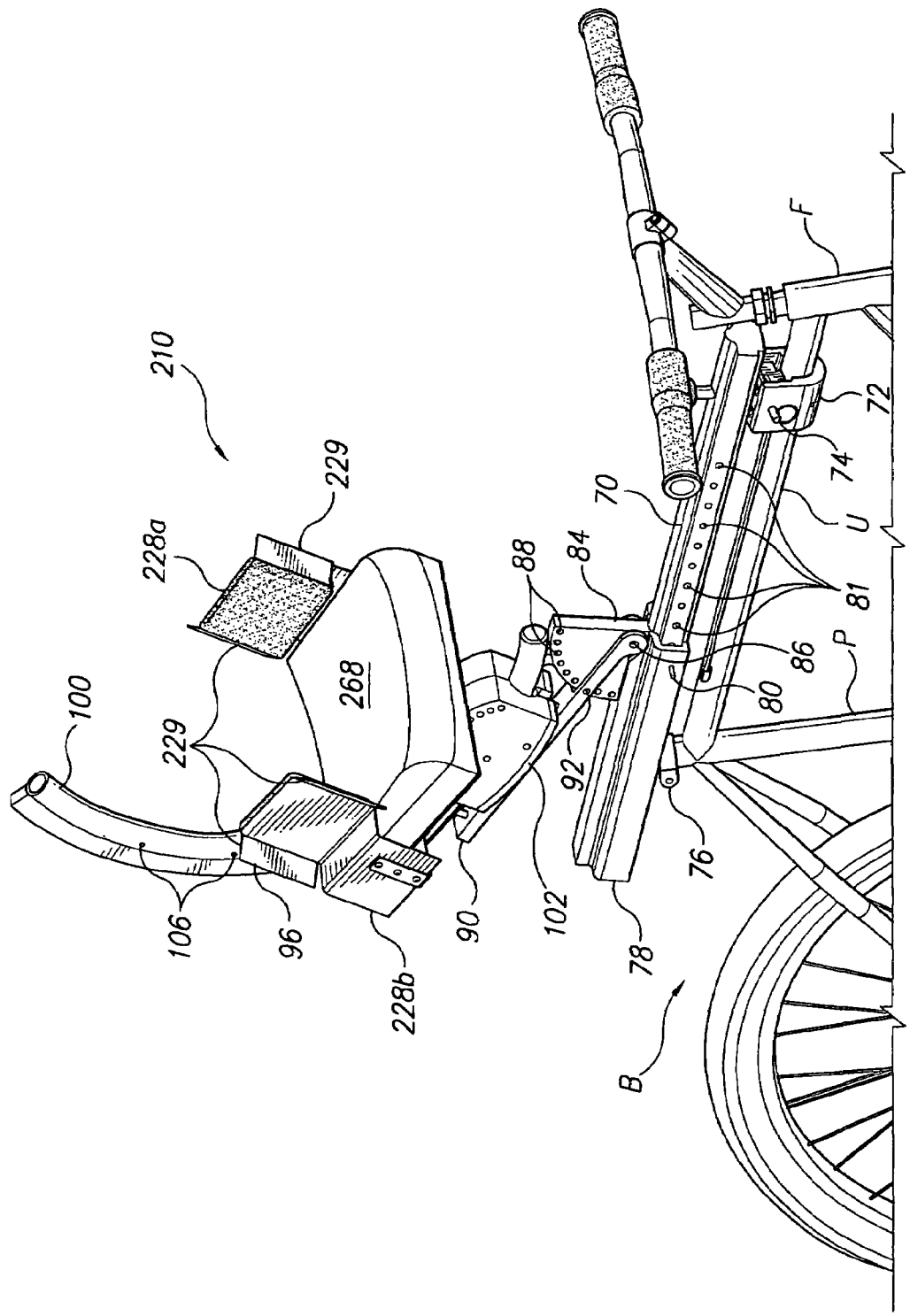
FIG. 8 is a perspective view of the seat of FIG. 7 installed upon the longitudinal and arcuate adjustment assembly of FIG. 5.

FIGS. 7 and 8 illustrate another embodiment of the cycle seat, designated as cycle seat 210. The seat 210 includes only a single laterally adjustable wing pair positioned to cradle the hips. Those components of the seat 210 that are identical to the components of the seat 10 illustrated particularly in FIGS. 2 and 4 of the drawings retain the same reference numerals.

The seat 210 includes a base plate 12 upon which the remainder of the mechanism is attached. At least one pair of laterally adjustable extension arms are installed atop the base plate 12, preferably with rearwardly disposed left and right side hip extension arms 16a and 16b.

Each of the hip support extension arms 16a, 16b includes a base plate attachment end portion 22a, 22b and an opposite distal or outboard thigh wing or bolster attachment end portion 24a, 24b. Left and right side hip support wings or bolsters 228a and 228b attach to the hip wing or bolster attachment end portions 24a, 24b of the rearward extension arms 16a and 16b. The wings or bolsters 228a, 228b differ from the corresponding components of the embodiment illustrated in FIGS. 1 through 6 due to the angular extension flanges 229 extending forwardly and rearwardly from each wing 228a, 228b. These extension flanges 229 provide some additional rigidity for the wings or bolsters 228a, 228b, and may be incorporated with any of the wings or bolsters 26a, 26b, 28a, and/or 28b of the first embodiment. The bolsters or wings 228b may be padded or upholstered, as shown along the inboard surfaces of the two left side wings 26a and 28a in FIG. 1.

The extension arms 16a and 16b are captured upon the base plate by a guide plate 32. The guide plate 32 may extend laterally across the base plate 12 and be attached thereto by appropriate fasteners (cap screws, etc.). The guide plate 32 includes a pair of underlying extension arm channels 36a, 36b. These extension arm channels 34a through 36b are shown for the rear adjuster assembly in the sectional view of FIG. 3, with the extension arms 16b installed therein.

Each of the extension arms 16b includes a toothed rack disposed along the inboard or base plate attachment portion thereof. The racks 40a, 40b are shown separated from their respective base plate attachment portions 22a, 22b of the two extension arms 16a, 16b. The toothed edges or faces 42 of each rack 40a, 40b face one another, and engage a pinion gear 46 disposed therebetween that in turn rotates on a shaft affixed within the guide plate 32. Rack clearance slots 50a and 50b are provided through the guide plate 32 for the two racks 40a, 40b of the arms 16a and 16b.

Thus, each extension arm of the extension arm set or pair 16a, 16b is forced to move simultaneously with, but opposite to, its opposite arm due to their toothed racks 40a, 40b simultaneously engaging the pinion 46. As the pinion 46 rotates, e.g., clockwise when viewed from above, both the left and right extension arms 16a and 16b are caused to move outwardly simultaneously with one another. Thus, the rider of a cycle equipped with the cycle seat 210 may push or pull either of the two extension arms of an extension arm set, e.g., the left arm 16a and/or its wing or bolster 228a, to adjust both wings of the pair or set inwardly or outwardly simultaneously with one another.

The seat 210 with its laterally adjustable side wings or bolsters also includes a locking mechanism for the wing or bolster pair. The rearwardly disposed rack 40a of the extension arm pair includes detents 54 along its rearward face, i.e., the face opposite the toothed face 42. A rearward extension arm locking knob 62 is adjustably secured to the rearward portion of the base plate 12 by a block 64, with the knob 62 controlling forward and rearward motion of a detent engaging pin 66 for selective engagement of the detents 54 of the rack 40a.

The knob 62 is spring-loaded to cause the pin 66 to engage its rack detent 54. When the knob 62 is pulled outwardly, i.e., away from the remainder of the mechanism, the pin 66 is withdrawn from the detent 54 of its rear rack 40a, allowing the cyclist to adjust the wings or bolsters 28a, 28b. The knob mechanism may be temporarily locked in an outward, i.e., detent disengaged, position against its internal spring by conventional means, e.g., quarter-twist detents or catches, etc., to hold the lock knob and its pin clear of the rack detents. Suitable lock knobs and pins are manufactured by the Carr-Lane Manufacturing Co. of St. Louis, Mo., and may be used for the detent engagement and locking knob and pin described above. Alternative mechanisms serving substantially the same function may be substituted.

The cycle seat 268 is immovably affixed atop the base plate 12 and its guide plate 32, and associated mechanism. The inboard or base plate end portions 22a, 22b of the extension arms 16a and 16b are thus captured between the seat 268 and the underlying guide plate 32 and base plate 12. However, they are free to slide inwardly and outwardly beneath the seat 268 and within the corresponding channels 36a and 36b (as shown for the rear wing or bolster assembly in FIG. 2) of the guide plate 32, when the lock knob 62 is pulled to disengage its pin 66 from the detent 54 of the rack 40a. This allows the lateral spacing between the wings 228a and 228b to be adjusted by the cyclist relative to the seat 268 therebetween.

In conclusion, the cycle seat 10, with its laterally adjustable bolsters or wings and various adjustments provided by the additional mechanisms shown in FIGS. 4 and 5, provides a multitude of seating configurations for the cyclist. The provision of laterally-adjustable wings or bolsters for the thighs and/or hips of the cyclist allows the cyclist to apply lateral thrust for controlling the balance of the cycle by means of the thigh and/or hip wings of the seat, with the lateral adjustment of the wings allowing cyclists of widely differing body builds to make use of the same seat mechanism. It will be seen that the cycle seat 10 in its various embodiments may be incorporated into virtually any practicable type of pedal-powered cycle, regardless of the number of wheels or seats the cycle may have. This seat mechanism with its laterally adjustable bolsters or wings, particularly in combination with the other adjustment mechanisms described herein, serve to greatly facilitate the comfort and control of the cyclist, particularly during strenuous riding conditions.

It is to be understood that the present invention is not limited to the embodiments described above, but encompasses any and all embodiments within the scope of the following claims.

We claim:

1. A cycle seat with adjustable sides, comprising:
   a base plate;
   at least one pair of left and right extension arms disposed atop the base plate, each of the extension arms having a base plate attachment portion and a distal wing attachment end opposite the base plate attachment portion, each of the extension arms being in mutually cooperating lateral adjustment with one another, wherein at least one of the extension arms has a plurality of detents formed thereon, the cycle seat further comprising an extension arm locking pin adjustably disposed upon the base plate and selectively engaging one of the detents, thereby locking the extension arm in place relative to the base plate;
   a lateral support wing extending upwardly from the distal end of each of the extension arms; and
   a seat disposed atop the base plate, the base plate attachment portion of each of the extension arms being captured between the seat and the base plate.

2. The cycle seat with adjustable sides according to claim 1, wherein each of the extension arms has a tooted rack disposed along the base plate attachment portion thereof, the cycle seat further comprising:
   at least one guide plate laterally disposed upon the base plate, the base plate attachment portion of each of the extension arms being disposed within the guide plate; and
   a pinion gear disposed between the toothed racks of the extension arms, the pinion gear simultaneous meshing with both of the racks.

3. The cycle seat with adjustable sides according to claim 2, wherein:
   said at least one guide plate comprises a front guide plate disposed upon a forward portion of said base plate and a rear guide plate disposed upon a rear portion of said base plate; and
   said at least one pair of extension arms comprises a pair of thigh extension arms adjustably extending from the front guide plate and a pair of hip extension arms adjustably extending from the rear guide plate.

4. The cycle seat with adjustable sides according to claim 1, further comprising:
   an arcuate seat assembly track having a cycle structure attachment portion and an upper distal end opposite the cycle structure attachment portion; and
   a seat assembly attachment trolley adjustably disposed along the seat assembly track, the base plate being pivotally attached to the seat assembly attachment trolley.

5. The cycle seat with adjustable sides according to claim 1, further comprising:
   a straight, elongate cycle frame attachment rail; and
   a seat base support sleeve adjustably disposed along the attachment rail, the base plate being disposed upon the seat base support sleeve.

6. The cycle seat with adjustable sides according to claim 1, further comprising:
   a straight, elongate cycle frame attachment rail;
   a seat base support sleeve adjustably disposed along the attachment rail;
   an arcuate seat assembly track having a cycle structure attachment portion adjustably secured to the seat base support sleeve and an upper distal end opposite the cycle structure attachment portion; and a seat assembly attachment trolley adjustably disposed along the seat assembly track, the base plate being pivotally attached to the seat assembly attachment trolley.

7. The cycle seat with adjustable sides according to claim 1 in combination with a bicycle, comprising a bicycle having a frame, the base plate being mounted atop the frame of the bicycle.

8. A cycle seat with adjustable sides, comprising:
an arcuate seat assembly track having a cycle structure attachment portion and an upper distal end opposite the cycle structure attachment portion;
a seat assembly attachment trolley adjustably disposed along the seat assembly track;
a base plate pivotally attached to the seat assembly attachment trolley;
at least one pair of left and right extension arms disposed atop the base plate, each of the extension arms having a base plate attachment portion and a distal wing attachment end opposite the base plate attachment portion, each of the extension arms being in mutually cooperating lateral adjustment with one another; a lateral support wing extending upwardly from the distal end of each of the extension arms; and
a seat disposed atop the base plate, the base plate attachment portion of each of the extension arms being captured between the seat and the base plate.

9. The cycle seat with adjustable sides according to claim 8, wherein each of the extension arms has a toothed rack disposed along the base plate attachment portion thereof, the cycle seat further comprising:
at least one guide plate laterally disposed upon the base plate, the base plate attachment portion of each of the extension arms being disposed within the guide plate; and
a pinion gear disposed between the toothed racks of the extension arms, the pinion gear simultaneous meshing with both of the racks.

10. The cycle seat with adjustable sides according to claim 9, wherein:
said at least one guide plate comprises a front guide plate disposed upon a forward portion of said base plate and a rear guide plate disposed upon a rear portion of said base plate; and
said at least one pair of extension arms comprises a pair of thigh extension arms adjustably extending from the front guide plate and a pair of hip extension arms adjustably extending from the rear guide plate.

11. The cycle seat with adjustable sides according to claim 8, wherein at least one of the extension arms has a plurality of detents formed thereon, the cycle seat further comprising an extension arm locking pin adjustably disposed upon the base plate and selectively engaging one of the detents, thereby locking the extension arm in place relative to the base plate.

12. The cycle seat with adjustable sides according to claim 8, further comprising:
a straight, elongate cycle frame attachment rail; and
a seat base support sleeve adjustably disposed along the attachment rail, the base plate being disposed upon the seat base support sleeve.

13. The cycle seat with adjustable sides according to claim 8 in combination with a bicycle, comprising a bicycle having a frame, the base plate being mounted atop the frame of the bicycle.

14. A cycle seat with adjustable sides, comprising:
a straight, elongate cycle frame attachment rail;
a seat base support sleeve adjustably disposed along the attachment rail;
a seat track support arm pivotally and adjustably disposed upon the seat base support sleeve;
a base plate pivotally and adjustably disposed upon the seat track support arm;
at least one pair of left and right extension arms disposed atop the base plate, each of the extension arms having a base plate attachment portion and a distal wing attachment end opposite the base plate attachment portion, each of the extension arms being in mutually cooperating lateral adjustment with one another;
a lateral support wing extending upwardly from the distal end of each of the extension arms; and
a seat disposed atop the base plate, the base plate attachment portion of each of the extension arms being captured between the seat and the base plate.

15. The cycle seat with adjustable sides according to claim 14, wherein each of the extension arms has a toothed rack disposed along the base plate attachment portion thereof, the cycle seat further comprising:
at least one guide plate laterally disposed upon the base plate, the base plate attachment portion of each of the extension arms being disposed within the guide plate; and
a pinion gear disposed between the toothed racks of the extension arms, the pinion gear simultaneous meshing with both of the racks.

16. The cycle seat with adjustable sides according to claim 15, wherein:
said at least one guide plate comprises a front guide plate disposed upon a forward portion of said base plate and a rear guide plate disposed upon a rear portion of said base plate; and
said at least one pair of extension arms comprises a pair of thigh extension arms adjustably extending from the front guide plate and a pair of hip extension arms adjustably extending from the rear guide plate.

17. The cycle seat with adjustable sides according to claim 14, wherein at least one of the extension arms has a plurality of detents formed thereon, the cycle seat further comprising an extension arm locking pin adjustably disposed upon the base plate and selectively engaging one of the detents, thereby locking the extension arm in place relative to the base plate.

18. The cycle seat with adjustable sides according to claim 14, further comprising:
an arcuate seat assembly track having a cycle structure attachment portion and an upper distal end opposite the cycle structure attachment portion; and
a seat assembly attachment trolley adjustably disposed along the seat assembly track, the base plate being pivotally attached to the seat assembly attachment trolley.

19. The cycle seat with adjustable sides according to claim 14 in combination with a bicycle, comprising a bicycle having a frame, the base plate being mounted atop the frame of the bicycle.

* * * * *